United States Patent
Ishihara et al.

(10) Patent No.: US 6,746,763 B2
(45) Date of Patent: Jun. 8, 2004

(54) CLEAR PAINT COMPOSITIONS AND MULTI-LAYERED COATING FORMED BY USING SAME

(75) Inventors: Tatsuya Ishihara, Machida (JP); Masahiko Yamanaka, Isehara (JP); Tetsuji Mizuno, Inagi (JP); Goro Saito, Hiratsuka (JP); Yoshizumi Matsuno, Hadano (JP)

(73) Assignees: Nissan Motor Co., Ltd., Kanagawa-ken (JP); Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 10/245,340

(22) Filed: Sep. 18, 2002

(65) Prior Publication Data

US 2003/0064229 A1 Apr. 3, 2003

(30) Foreign Application Priority Data

Sep. 19, 2001 (JP) .......................... 2001-284699

(51) Int. Cl.$^7$ .................. B32B 27/00; C08L 63/00; C08L 83/04
(52) U.S. Cl. ................ 428/336; 428/335; 428/413; 428/447; 428/480; 428/523; 106/287.16; 106/287.22; 106/14.05; 525/55; 525/107; 525/185; 525/476; 525/477; 525/479

(58) Field of Search ................. 525/50, 55, 63, 525/69, 107, 185–187, 474, 476, 477, 479; 106/287.1, 287.16, 287.22, 14.05; 428/413, 417, 418, 447, 448, 450, 480, 523, 332, 334, 335, 336

(56) References Cited

U.S. PATENT DOCUMENTS

2002/0103288 A1 * 8/2002 Haubennestel et al. ..... 524/588
2003/0138634 A1 * 7/2003 Kato et al. .................. 428/413

FOREIGN PATENT DOCUMENTS

WO          95/28452        10/1995

* cited by examiner

Primary Examiner—Philip Tucker
Assistant Examiner—Michael J Feely
(74) Attorney, Agent, or Firm—Wenderoth, Lind & Ponack, L.L.P.

(57) ABSTRACT

This invention provides a clear paint composition suitable for application on base coated surface of a coating object, which is characterized by comprising (a) a hydroxyl- and epoxy-containing acrylic resin, (b) a high acid value polyester resin having an acid value of 120–200 mgKOH/g and a number-average molecular weight of 500–4,000, (c) an alkoxysilyl-containing acrylic resin, and (d) an acrylic resin containing alkoxysilyl groups and dimethylpolysiloxane side chains, and forming a coating which, after being cured, has a glass transition point within a range of 100–120° C.

17 Claims, No Drawings

CLEAR PAINT COMPOSITIONS AND MULTI-LAYERED COATING FORMED BY USING SAME

This invention relates to acid-epoxy-silane system clear paint compositions to be applied onto base-coated surfaces of object substrate. In particular, the invention relates to clear paint compositions capable of forming coating film of improved water repellency and oil repellency, without any deterioration in acid resistance thereof.

Conventionally, "2-coat-1-bake (2C1B) system" in which, for example, metallic paint and clear paint are applied wet-on-wet, and heated to be simultaneously cured to form a multi-layered top coating, has been widely adopted as a top coating method of exterior panels of automotive bodies. It is also known to use as the clear paint in said method an acid-epoxy-silane system clear paint whose chief ingredients are acrylic resin having hydroxyl groups and epoxy groups, high acid value polyester resin and alkoxysilyl-containing acrylic resin.

Multi-layered top coatings formed by this coating system excel in weatherability, acid resistance, etc., but have a defect that their water repellency and oil repellency are insufficient. Where water repellency of a coating is insufficient, it becomes necessary to apply wax frequently onto the coating to impart water repellency thereto, which is a quite complex operation. Whereas, when the coating has insufficient oil repellency, birds' droppings or dead insects adhere thereto, leaving spots of deteriorated gloss or leveling property on the coat surface after their removal and impairing the finished appearance.

We have conducted concentrative studies to solve the problems as above, and now discovered that the object could be accomplished by using, as the clear paint composition to be applied onto base-coated surfaces of an object substrate, an acid-epoxy-silane system paint which further contains an acrylic resin containing alkoxysilyl groups and dimethylpolysiloxane side chains, said paint forming a cured coating having a glass transition point of 100–120° C. The present invention is thus completed.

Thus, according to the present invention, a clear paint composition characterized by comprising
 (a) a hydroxyl- and epoxy-containing acrylic resin,
 (b) a high acid value polyester resin having an acid value of 120–200 mgKOH/g and a number-average molecular weight of 500–4,000,
 (c) an alkoxysilyl-containing acrylic resin, and
 (d) an acrylic resin containing alkoxysilyl groups and dimethylpolysiloxane side chains, and forming a coating which, after being cured, has a glass transition point within a range of 100–120° C.

Because the multi-layered coating formed by applying a clear paint composition of the present invention onto a base-coated surface excels in acid resistance, water repellency and oil repellency, it is particularly suitable for top coating on exterior or outer panels of automotive bodies for which these properties are strongly in demand. Specifically, it is preferred to apply a clear paint composition of the present invention on base-coated surface which is formed either directly on outer panels (coating object) of car bodies such as metallic or plastic automobiles, trucks, motorbikes, buses and the like, or through an undercoat such as of cationic electrodeposition paint and further optionally an intercoat applied on the undercoat and cured. In that occasion, said metallic coating object is preferably chemically treated in advance, with phosphate, chromate or the like. As said undercoating paint and intercoating paint, those known per se can be used.

The clear paint compositions of the invention are applied onto the base-coated surfaces of such coating objects as above-described.

The base coating preferably is sparkling and bright or iridescent, which can be formed, for example, by applying a base coating (A) comprising base resin, crosslinking agent, pigment (metallic or iridescent pigment) and organic solvent onto a coating object.

As examples of base resin, acrylic, polyester and alkyd resins having crosslinkable functional groups such as hydroxyl group; and as examples of crosslinking agent, those reactable with said functional groups, such as melamine resin and blocked polyisocyanate compounds, may be named. The blend ratio of the base resin and crosslinking agent adequately falls within a range of, based on the combined solid weight of the two components, 50–90%, in particular, 65–80%, of the former and 50–10%, in particular, 35–20%, of the latter.

As examples of the metallic pigment, aluminum flakes, aluminum oxide and vapor-deposited aluminum may be named, and as iridescent pigment, for example, titanium dioxide-covered mica may be named. In this specification these pigments are hereafter referred to as "metallic pigment, etc.". Blend ratios of these metallic pigment, etc. may be optionally selected according to individual purpose, while generally it is within a range of 5–30 parts, in particular, 10–25 parts by weight, per 100 parts of combined solid weight of the base resin and crosslinking agent.

As organic solvent, conventional organic solvents for paints can be conveniently used. The base coating (A) may further contain, as individual occasions demand, extender, sedimetation-preventing agent, catalyst and the like.

Solid content of base coating (A) at application time preferably is within a range of 5–40% by weight, in particular, 10–30% by weight, and the hiding film thickness, within a range of 5–20 μm, in particular, 10–15 μm. Here "hiding film thickness" refers to: when a base coating (A) is applied onto a black-and-white checkered pattern painted on a coating object, the minimum film thickness (cured coating film) of the base coating (A) through which the black-and-white checkered pattern underneath is invisible. Less hiding film thickness signifies better hiding ability.

Base coating (A) can be applied onto such a coating object as earlier described, by ordinary coating means such as air spray, airless spray and electrostatic coating. Preferably its film thickness is at least same as the hiding film thickness. Thus, normally the film thickness preferably lies within a range of 5–20 μm, in particular, 10–15 μm, or may be even more, in terms of cured coating film.

According to the present invention, it is preferred to apply onto the base coating film formed by applying a base coating (A) onto a coating object, a clear paint composition (B), before the base coating film is cured, i. e. while the film is remaining in substantially uncured condition.

Clear paint composition (B) is a paint which forms a colorless transparent, or colored transparent, coating film. According to the present invention, a clear paint composition comprising:
 (a) an acrylic resin having hydroxyl groups and epoxy groups,
 (b) a high acid value polyester resin having an acid value of 120–200 mgKOH/g and a number-average molecular weight of 500–4,000,
 (c) an alkoxysilyl-containing acrylic resin, and
 (d) an acrylic resin having alkoxysilyl groups and dimethylpolysiloxane side chains, and forming a coating which, after being cured by heating at 140° C. for 30 minutes, has a glass transition point (Tg) within a range of 100–120° C. is used.

Hereafter the clear paint composition of the present invention is explained in further details.

Component (a): an acrylic resin having hydroxyl groups and epoxy groups

This is an acrylic resin containing at least one each of hydroxyl group and epoxy group per molecule. Such an acrylic resin can be obtained, for example, by copolymerizing a hydroxyl-containing polymerizable monomer, epoxy-containing polymerizable monomer, acrylic polymerizable monomer, and if necessary still other polymerizable monomer(s).

A hydroxyl-containing polymerizable monomer is a compound containing at least one each of hydroxyl group and polymerizable double bond per molecule, examples of which including 2-hydroxyethyl acrylate, 2-hydroxyethyl methacrylate, hydroxypropyl acrylate, hydroxypropyl methacrylate, hydroxybutyl acrylate, hydroxybutyl methacrylate and hydroxyalkyl (meth)acrylates which are obtained by reacting the foregoing with lactones.

An epoxy-containing polymerizable monomer is a compound containing at least one each of epoxy group and polymerizable double bond per molecule, examples of which include glycidyl acrylate, glycidyl methacrylate and allylglycidyl ether.

Acrylic polymerizable monomers include monoesterified products of acrylic acid or methacrylic acid with $C_1$–$C_{20}$ monoalcohols, specific examples including methyl acrylate, ethyl acrylate, propyl acrylate, butyl acrylate, hexyl acrylate, 2-ethylhexyl acrylate, stearyl acrylate, lauryl acrylate, cyclohexyl acrylate, methyl methacrylate, ethyl methacrylate, propyl methacrylate, butyl methacrylate, hexyl methacrylate, 2-ethylhexyl methacrylate, stearyl methacrylate, lauryl methacrylate and cyclohexyl methacrylate. Furthermore, $C_2$–$C_{20}$ alkoxyalkyl esters of acrylic acid or methacrylic acid can also be used as the acrylic polymerizable monomers.

"Other polymerizable monomers" are those other than said hydroxyl-containing polymerizable monomers, epoxy-containing polymerizable monomers and acrylic polymerizable monomers, which contain at least one polymerizable double bond per molecule, for example, styrene, vinyltoluene, acrylonitrile, vinyl acetate, vinyl chloride, ethylene, propylene and acrylamide.

Copolymerization of said hydroxyl-containing polymerizable monomer, epoxy-containing polymetizable monomer, acrylic polymerizable monomer and if necessary still other polymerizable monomer can be conducted by ordinary polymerization methods, the most suitable being solution type radical polymerization method.

Thus obtained component (a) is an acrylic resin containing at least one each of hydroxyl group and epoxy group per molecule. It is generally preferred for the resin to have a hydroxyl value within a range of 5–150 mgKOH/g, in particular, 25–100 mgKOH/g; an epoxy group content within a range of 0.8–3.6 mmol/g, in particular, 1.2–3.2 mmol/g; and a number-average molecular weight within a range of 1,000–10,000, in particular, 1,500–8,000.

Component (b): a high acid value polyester resin having an acid value of 120–200 mgKOH/g and a number-average molecular weight of 500–4,000

This component (b) can be obtained, for example, by ring-opening addition of a polybasic acid anhydride to hydroxyl groups in said hydroxyl-containing polyester resin by semi-esterification reaction to introduce at least two carboxyl groups per molecule of said polyester resin.

Those hydroxyl-containing polyester resin prior to the ring-opening addition can be obtained, for example, by esterification of polyhydric alcohol component with polybasic acid component by a known method in which an excessive ratio of the former is present. Polyhydric alcohol component useful in that occasion is a compound containing at least two hydroxyl groups per molecule, examples of which include dihydric alcohols such as ethylene glycol, propylene glycol, dipropylene glycol, butanediol, pentanediol, hexanediol and cyclohexanedimethanol; and tri- or higher hydric alcohols such as glycerine, trimethylolpropane, pentaerythritol and dipentaerythritol. The polybasic acid component is a compound having at least two carboxyl groups per molecule, examples of which include terephthalic acid, isophthalic acid, phthalic acid, naphthalenedicarboxylic acid, biphenyldicarboxylic acid, hexahydrophthalic acid, hexahydroterephthalic acid, hexahydroisophthalic acid, adipic acid, sebacic acid, suberic acid, succinic acid, maleic acid, fumaric acid, azelaic acid, itaconic acid, dimeric acid, trimellitic acid, pyromellitic acid and anhydrides of those acids.

Semi-esterification reaction can be conducted in the manner known per se. As examples of polybasic acid anhydride useful in that occasion, phthalic anhydride, succinic anhydride, tetrahydrophthalic anhydride, hexahydrophthalic anhydride, maleic anhydride, trimellitic anhydride and pyromellitic anhydride can be named. The high acid value polyester resin (component b) into which carboxyl groups have been introduced by such semi-esterification reaction (ring-opening addition reaction of polybasic acid anhydride) preferably has an acid value within a range of 120–200 mgKOH/g, in particular, 125–180 mgKOH/g, and a number-average molecular weight within a range of 500–4,000, in particular, 1,000–3,000.

Concerning said component (b), where its acid value is less than 120 mgKOH/g and/or its number-average molecular weight is less than 500, curability of the clear coating film formed from a clear paint composition (B) deteriorates. On the other hand, where the acid value is more than 200 mgKOH/g and/or the number-average molecular weight is more than 4,000, leveling property of the clear coating tends to deteriorate.

Component (c): alkoxysilyl-containing acrylic resins

Component (c) is an acrylic resin containing at least one alkoxysilyl group per molecule. Here "alkoxysilyl group" signifies a group in which an oxygen atom in alkoxy group formed of an alkyl group (preferably a $C_1$–$C_5$ alkyl group) bound to said oxygen atom is directly bonded to silicon (Si).

Such component (c) can be produced by, for example, copolymerizing alkoxysilyl-containing polymerizable monomer, acrylic polymerizable monomer, and if necessary hydroxyl-containing polymerizable monomer and other polymerizable monomer. The copolymerization can most suitably be conducted by ordinary solution-type radical polymerization method.

Alkoxysilyl-containing polymerizable monomer is a silane compound containing at least one each of alkoxy group and polymerizable double bond per molecule, examples of which include vinyltrimethoxysilane, vinyltriethoxysilane, vinyltris(methoxyethoxy)silane, γ-acryloyloxypropyltriethoxysilane, γ-methacryloyloxypropyltriethoxysilane, γ-acryloyloxypropyltrimethoxysilane, γ-methacryloyloxypropyltrimethoxysilane, γ-acryloyloxypropylmethyldiethoxysilane,
γ-methacryloyloxypropylmethyldiethoxysilane,
γ-acryloyloxypropylmethyldimethoxysilane,
γ-metharyloyloxypropylmethyldimethoxysilane and the like.

As the acrylic polymerizable monomer, and hydroxyl-containing polymerizable monomer and other polymerizable monomer which are used if necessary, those exemplified in the explanation of above component (a) can be used with similar convenience.

In preparing such component (c), the copolymerization ratios among those polymerizable monomers are not subject to strict limitation, while it is generally convenient that alkoxysilyl-containing polymerizable monomer is used within a range of 5–80%, in particular, 10–60%; acrylic polymerizable monomer, 10–95%, in particular, 25–90%; hydroxyl-containing polymerizable monomer, not more than 50%, in particular, 5–30%; and other polymerizable monomer, not more than 85%, in particular, 10–60%; all based on the combined weight of these monomers. The component (c) generally adequately has a number-average molecular weight of 1,000–10,000, in particular, 1,500–8,000.

Component (d): Acrylic resin having alkoxysilyl groups and dimethylpolysiloxane side chains Component (d) is an acrylic resin having at least one each of alkoxysilyl group and dimethylpolysiloxane side chain per molecule. Here "dimethylpolysiloxane chain" preferably has a structure that the greatest part of its main chain is siloxane chain, each Si therein directly bonding with two methyl groups, and methyl groups also directly bond with Si at the terminals.

Said component (d) can be prepared by, for example, copolymerizing alkoxysilyl-containing polymerizable monomer, dimethylpolysiloxane chain-containing polymerizable monomer, acrylic polymerizable monomer and if necessary hydroxyl-containing polymerizable monomer and other polymerizable monomer. The copolymerization can most suitably be conducted by ordinary solution-type radical polymerization method.

Of those monomers, as the alkoxysilyl-containing polymerizable monomer, acrylic polymerizable monomer, hydroxyl-containing polymerizable monomer and other polymerizable monomer, those exemplified in the explanation of components (a) and (c) can be used with similar convenience.

As dimethylpolysiloxane chain-containing polymerizable monomer, a compound which contains at least one each of "dimethylpolysiloxane chain" and polymerizable double bond (e.g., acryloxy or methacryloxy group) per molecule can be used. Specifically, for example, compounds expressed by the following structural formula can be named:

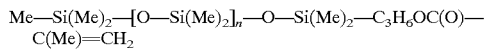

Me—Si(Me)$_2$—[O—Si(Me)$_2$]$_n$—O—Si(Me)$_2$—C$_3$H$_6$OC(O)—C(Me)=CH$_2$ in which Me stands for methyl group.

Such dimethylpolysiloxane chain-containing polymerizable monomers are known and commercially available, for example, under tradenames of "Silaplaine FM-0711", "Silaplaine FM-0721" and "Silaplaine FM-0725" supplied by Chisso Corporation.

Normally, such dimethylpolysiloxane chain-containing polymerizable monomer preferably has a number-average molecular weight of 1,000–10,000, in particular, 2,000–8,000.

In preparing the component (d), the copolymerization ratios among those polymerizable monomers are not subject to strict limitation, while it is generally convenient that alkoxysilyl-containing polymerizable monomer is used within a range of 5–80%, in particular, 10–60%; dimethylpolysiloxane chain-containing polymerizable monomer, 0.1–20%, in particular, 0.5–12%; acrylic polymerizable monomer, 10–95%, in particular, 25–90%; hydroxyl-containing polymerizable monomer, not more than 50%, in particular, 5–30%; and other polymerizable monomer, not more than 85%, in particular, 10–60%; all based on the combined weight of these monomers. The component (d) generally adequately has a number-average molecular weight of 1,000–10,000, in particular, 1,500–8,000.

The concurrent use of component (d) with those earlier described components (a), (b) and (c) enables the paint compositions according to the present invention to form coatings which can maintain water repellency for many hours. The reason therefor is not yet fully made clear, but is inferred it is due to dimethylpolysiloxane chains having a water repelling function which are bound to the acrylic resin's skeletal structure of component (d) in free state as side chains, and furthermore the alkoxysilyl groups which are concurrently present in component (d) crosslink with the hydroxyl groups in component (a) and alkoxysilyl groups in component (c).

Clear Paint Composition (B)

It is important for the clear paint composition (B) used according to the present invention to contain those components (a), (b), (c) and (d), and for the coating film formed of the composition alone, to have a glass transition point after curing within a range of 100–120° C., preferably 105–115° C.

Glass transition temperature of cured coating is measured as to each coating film (film thickness: 35 μm) which is isolated after curing, at a frequency of 110 Hz and temperature rise rate of 3° C./min., using Dynamic Viscoelastometer, Model VIBRON DDV IIEA, Toyo Baldwin Co., Ltd., trademark).

Glass transition temperature of cured coating film can be readily adjusted by varying compositions of above-described components, blend ratios among those components, etc. Where glass transition point of cured coating film formed of a clear paint composition (B) alone is lower than 100° C., acid resistance of the coating film is reduced. On the other hand, when it becomes higher than 120° C., durability of the coating film (e.g., crack resistance, etc.) tends to be lowered.

Blend ratios of the components (a), (b), (c) and (d) in clear paint composition (B) are not subject to strict limitation, but can be suitably selected according to purpose of use of individual paint compositions. Specifically, considering the glass transition temperature of cured coating film, it is generally preferred to select such ranges as 35–49%, in particular, 40–48%, of component (a); 35–49%, in particular, 40–48%, of component (b); and 2–30%, in particular, 4–20%, of component (c); based on the combined solid weight of the components (a), (b) and (c). Also the generally suitable range of component (d) is, per 100 parts by weight of combined solid contents of components (a), (b) and (c), 0.5–20 parts by weight, in particular, 1–5 parts by weight. When the ratios of components (a), (b) and (c) are included among the above ranges, the coating exhibits favorable acid resistance, and when the ratio of component (d) falls within the above range, water repellency and oil repellency of the coating can be further improved. Hence, those ranges are particularly advantageous.

Clear paint composition (B) can contain, besides said components (a), (b), (c) and (d), if necessary coloring pigment or metallic pigment to an extent not detrimental to transparency of the coating film. It is also permissible to add ultraviolet-absorbing agent, photostabilizer, flow property-adjusting agent and the like to the composition, as occasions demand.

Clear paint composition (B) is formed by mixing those individual components in an organic solvent for paint. At the time of application, it is preferred to apply clear paint composition (B) onto an uncured, coated surface of base coating (A), after adjusting its solid content to 20–80% by weight, in particular, 25–50% by weight; and its viscosity, to 10–30 seconds/Ford Cup #4/20° C. (following JISK 5400). Application of clear paint composition (B) can be conducted by ordinary application method such as air spray, airless spray or electrostatic coating. Generally preferred coating thickness ranges, as that of cured coating, 10–60 μm, in particular, 20–40 μm.

According to the present invention, it is preferred to apply onto an object to be coated a base coating (A) and clear paint composition (B) wet-on-wet as above-described, and thereafter heat the coated surface at 100–180° C., in particular, 120–160° C., for around 10–40 minutes to crosslink and cure the two coatings at the same time, for improving water repellency and oil repellency of the coating, without impairing its weatherability or acid resistance.

In occasions of forming multi-layered coating on, for example, outer panels of automobiles, by applying a clear paint onto a base-coated surface, when conventional clear paint comprising above-described three components (a), (b) and (c) is used, the resulting multi-layered coating excels in acid resistance, but its water repellency and oil repellency are insufficient to render car-washing operation complex. Furthermore, when birds' droppings or the like stick onto outer panels of automobiles, the spots left after their removal tend to have deteriorated gloss. Such defects can be removed by use of a clear paint according to the present invention, in which the component (d) is further added to said components (a), (b) and (c) and which moreover is adjusted to let Tg of its cured coating fall within the range of 100–120° C., whereby water repellency and oil repellency of the coating are markedly improved without impairing its acid resistance. Therefore, when a clear paint composition according to the present invention is used as the top coating of outer panels of automobiles, car-washing operations are simplified, and moreover such remarkable effect can be obtained that even when birds' droppings stick, the stuck spots can retain the original gloss.

Hereinafter the present invention is explained more specifically, referring to working examples and comparative examples in which parts and percentages are by weight and coating thickness refers to cured film thickness. It should be understood, furthermore, that these working examples in no way limit the scope of the present invention.

1. Preparation of Samples

1) Object to be Coated

Onto a 0.8 mm-thick dull-finished steel sheet which had been chemically treated with zinc phosphate, a thermosetting epoxy resin-based cationic electrodeposition coating, "ELECRON™ 9600" (Kansai Paint Co., Ltd.) was electrodeposited to a film thickness of about 20 μm, followed by 30 minutes' heating at 170° C. to cure the coating. Further an intercoating for automobiles (thermosetting polyester resin.melamine resin-type organic solvent-based coating), "TP-37 Primer-Surfacer™" (Kansai Paint Co., Ltd.) was air-sprayed to a film thickness of about 25 μm, followed by 30 minutes' heating at 140° C. to cure the coating, to provide a sample object to be coated.

2) Base Coating (A)

An acrylic resin.melamine resin-type thermosetting, organic solvent-based metallic paint, "MAGICRON™ TB-515" (Kansai Paint Co., Ltd.)

3) Clear Paint Composition (B)

3-1) Preparation of an Acrylic Resin (a-1) having Hydroxyl and Epoxy Groups

A reaction vessel was charged with 410 parts of xylene and 77 parts of n-butanol, heated to 125° C., and at said temperature a monomeric component (styrene, 122 parts; glycidyl methacrylate, 490 parts; hydroxyethyl methacrylate, 184 parts; cyclohexyl methacrylate, 428 parts; and azobisisobutyronitrile, 72 parts) was dropwisely added at a uniform rate, over a period of 4 hours. Here the azobisisobutyronitrile was a polymerization initiator. The system was aged for 30 minutes, followed by a further dropwise addition of a mixture composed of 90 parts of xylene, 40 parts of n-butanol and 14.4 parts of azobisisobutyronitrile, over a period of 2 hours. After the following 2 hours' aging, an acrylic resin (a-1) having hydroxyl groups and epoxy groups was obtained. This acrylic resin had a number-average molecular weight of 2,000, an epoxy group content of 2.82 mmol/g and a hydroxyl value of 65 mgKOH/g.

(3-2) Preparation of Acrylic Resin (a-2) having Hydroxyl Groups and Epoxy Groups A reaction vessel was charged with 410 parts of xylene and 77 parts of n-butanol, heated to 125° C., and at said temperature a monomeric component (styrene, 122 parts; glycidyl methacrylate, 490 parts; hydroxyethyl acrylate, 164 parts; n-butyl acrylate, 326 parts; cyclohexyl methacrylate, 122 parts; and azobisisobutyronitrile, 72 parts) was dropwisely added at a uniform rate, over a period of 4 hours. Here the azobisisobutyronitrile was a polymerization initiator. The system was aged for 30 minutes, followed by a further dropwise addition of a mixture composed of 90 parts of xylene, 40 parts of n-butanol and 14.4 parts of azobisisobutyronitrile, over a period of 2 hours. After the following 2 hours' aging, an acrylic resin (a-2) having hydroxyl groups and epoxy groups was obtained. This acrylic resin had a number-average molecular weight of 2,000, an epoxy group content of 2.82 mmol/g and a hydroxyl value of 65 mgKOH/g.

(3-3) Preparation of a High Acid Value Polyester Resin (b-1)

A reaction vessel was charged with 283 parts of 1,6-hexanediol, 491 parts of trimethylolpropane, 438 parts of adipic acid and 323 parts of hexahydrophthalic anhydride, and heated to 180° C. in nitrogen atmosphere. The temparature was then raised to 230° C. over the following 3 hours, and the system was reacted at said temperature for an hour. Thereafter xylene was added and the reaction was continued under reflux. Upon confirming that the resin acid value dropped to no higher than 3, the reaction system was cooled to 100° C., followed by addition of 776 parts of hexahydrophthalic anhydride. Raising the temperature again to 140° C., the reaction was continued for 2 hours. Cooling the reaction system and diluting the product with xylene, a high acid value polyester resin (b-1) having a solid content of 50% was obtained, which had a number-average molecular weight of 2400 and an acid value of 130 mgKOH/g.

(3-4) Preparation of an Alkoxysilyl-containing Acrylic Resin (c-1)

A reaction vessel was charged with 410 parts of xylene and 77 parts of n-butanol, heated to 125° C., and at said temperature a monomeric component (styrene, 288 parts; n-butyl methacrylate, 792 parts; γ-methacryloxypropyltriethoxysilane, 216 parts; 4-hydroxyn-butyl acrylate, 144 parts; and azobisisobutyronitrile, 72 parts) was droppwisely added at a uniform rate, oven a period of 4 hours. Here the azobisisobutyronitrile was a polymerization initiator. The system was aged for 30 minutes, followed by a further dropwise addition of a mixture composed of 90 parts of xylene, 40 parts of n-butanol and 14.4 parts of azobisisobutyronitrile, over a period of 2 hours. After the following 2 hours' aging, an alkoxysilyl-containing acrylic resin (c-1) was obtained, which had a number-average molecular weight of 2,000 and a hydroxyl value of 39 mgKOH/g.

(3-5) Preparation of an Alkoxysilyl- and Dimethylpolysiloxane Side Chain-containing Acrylic Resin (d-1)

A reaction vessel was charged with 410 parts of xylene and 77 parts of n-butanol, heated to 125° C., and at said temperature a monomeric component ("Silaplaine™ FM-0711", 144 parts; 4-hydroxy-n-butyl acrylate, 72 parts; γ-methacryloyloxypropyltriethoxysilane, 216 parts; n-butyl methacrylate, 720 parts; styrene, 288 parts; and azobisisobutyronitrile, 72 parts) was dropwisely added at a uniform rate, over a period of 4 hours. Here the azobisisobutyronitrile was a polymerization initiator. The system was aged for 30 minutes, followed by a further dropwise addition of a mixture composed of 90 parts of xylene, 40 parts of n-butanol and 14.4 parts of azobisisobutyronitrile, over a period of 2 hours. After the following 2 hours' aging, an alkoxysilyl-containing acrylic resin (d-1) was obtained, which had a number-average molecular weight of 3,000 and a hydroxyl value of 20 mgKOH/g.

(3-6) Preparation of Clear Paint (B)
(Components' Blended Amounts are by Respective Solids)

(B-1): Forty-five (45) parts of component (a-1), 45 parts of component (b-1), 10 parts of component (c-1) and 3 parts of component (d-1) were mixed and dissolved in an organic solvent (an equal weight mixture of xylene and ethyl acetate), to provide a clear paint (B-1) having a solid content of 35% by weight, with its viscosity adjusted to 20 seconds/Ford Cup #4/20° C.

(B-2): Forty-five (45) parts of component (a-1), 45 parts of component (b-1), 10 parts of component (c-1) were mixed and dissolved in an organic solvent (an equal weight mixture of xylene with ethyl acetate), to provide a clear paint (B-2) having a solid content of 35% by weight, with its viscosity adjusted to 20 seconds/Ford Cup #4/20° C. (control).

(B-3): Forty-five (45) parts of component (a-2), 45 parts of component (b-1), 10 parts of component (c-1) and 3 parts of component (d-1) were mixed and dissolved in an organic solvent (an equal weight mixture of xylene with ethyl acetate), to provide a clear paint (B-3) having a solid content of 35% by weight, with its viscosity adjusted to 20 seconds/Ford Cup #4/20° C. (control).

2. EXAMPLE AND COMPARATIVE EXAMPLES

Example 1

Base coating (A) was applied onto the coating object to a coating film thickness of 20 μm, allowed to stand for 2 minutes at room temperature, and then clear paint composition (B-1) was applied thereonto to a coating film thickness of 45 μm. Heating the coated object at 140° C. for 30 minutes, the two coating films were simultaneously cured.

Comparative Example 1

Base coating (A) was applied onto the coating object to a coating film thickness of 20 μm, allowed to stand for 2 minutes at room temperature, and then clear paint composition (B-2) was applied thereonto to a coating film thickness of 45 μm. Heating the coated object at 140° C. for 30 minutes, the two coating films were simultaneously cured.

Comparative Example 2

Base coating (A) was applied onto the coating object to a coating film thickness of 20 μm, allowed to stand for 2 minutes at room temperature, and then clear paint composition (B-3) was applied thereonto to a coating film thickness of 45 μm. Heating the coated object at 140° C. for 30 minutes, the two coating films were simultaneously cured.

3. Performance Tests

Performance tests of the multi-layered coatings were conducted with the coated sample panels as obtained in Example 1 and Comparative Examples 1 and 2, by the following methods. The results were as shown in Table 1.

Glass Transition Point (Tg)

This was measured as to each clear coating film (film thickness: 35 μm) which is isolated after curing by heating at 140° C. for 30 minutes, at a frequency of 110 Hz and temperature rise rate of 3° C./min., using Dynamic Viscoelastometer, Model VIBRON DDV IIEA (Toyo Baldwin Co., Ltd., trademark).

Acid Resistance

On the multi-layered coating film surface of each test panel, 0.4 cc of 40% aqueous sulfuric acid solution was dropped at plural spots. The surface was dried with a hot air dryer at 60° C. for 15 minutes and then washed with water. The condition of the washed surface was visually evaluated: ○ signifies no change was observed on the coating surface; Δ signifies slight traces of the spots were observed; and X, notable stains, whitening or swelling were observed at the spots.

Water Repellency

On the multi-layered coating film surface of each test panel, 0.3 cc of water was dripped and contact angles of said water drops with the coated surface were measured with Contact Angle Meter-X 150 (Kyowa Interface Science Co., Ltd.).

Oil Repellency

On the multi-layered coating film surface of each test panel, 0.3 cc of paraffine was dripped and contact angles of said paraffine drops with the coated surface were measured with Contact Angle Meter-X 150 (Kyowa Interface Science Co., Ltd.).

Resistance to Birds' Droppings

Doves' droppings in outdoors were collected and mixed with deionized water to form a 30%-concentration liquid, which was stirred for 30 minutes with Disper and filtered through a piece of cotton gauze. On the multi-layered coating film surface of each test panel, 0.4 cc of so obtained filtrate was dripped, dried in a gradient oven at 70° C. for 30 minutes and washed off with water. The washed surfaces were visually evaluated: ○ signified no soiling was observed at the spots on which the filtrate was dripped; Δ signifies minor occurrence of stains, blurs or swelling was observed; and X signifies notable occurrence of stains, blurs or swelling was observed.

TABLE 1

|  | Example | Comparative Examples | |
|---|---|---|---|
|  | 1 | 1 | 2 |
| Glass transition temp. | 110° C. | 110° C. | 78° C. |
| Acid repellency | ○ | ○ | Δ |
| Water repellency | 96 | 83 | 96 |

TABLE 1-continued

| | Example | Comparative Examples | |
|---|---|---|---|
| | 1 | 1 | 2 |
| Oil repellency | 42 | 30 | 41 |
| Resistance to birds' droppings | ○ | Δ | ○ |

What is claimed is:

1. A clear paint composition characterized by comprising
   (a) a hydroxyl- and epoxy-containing acrylic resin,
   (b) a high acid value polyester resin having an acid value of 120–200 mgKOH/g and a number-average molecular weight of 500–4,000,
   (c) an alkoxysilyl-containing acrylic resin, and
   (d) an acrylic resin containing alkoxysilyl groups and dimethylpolysiloxane side chains, and forming a coating which, after being cured, has a glass transition point (Tg) within a range of 100–120° C.

2. A clear paint composition according to claim 1, in which said acrylic resin (a) has a hydroxyl value within a range of 5–150 mgKOH/g and an epoxy group content within a range of 0.8–3.6 mmol/g.

3. A clear paint composition according to claim 1, in which said acrylic resin (a) has a number-average molecular weight within a range of 1,000–10,000.

4. A clear paint composition according to claim 1, in which said high acid value polyester resin (b) has an acid value within a range of 125–180 mgKOH/g.

5. A clear paint composition according to claim 1, in which said high acid value polyester resin (b) has a number-average molecular weight within a range of 1,000–3,000.

6. A clear paint composition according to claim 1, in which said alkoxysilyl-containing acrylic resin (c) is obtained by copolymerizing 5–80% of alkoxysilyl-containing polymerizable monomer, 10–95% of acrylic polymerizable monomer, not more than 50% of hydroxyl-containing polymerizable monomer and not more than 85% of other polymerizable monomer, based on the combined weight of all the monomers used.

7. A clear paint composition according to claim 1, in which said alkoxysilyl-containing acrylic resin (c) has a number-average molecular weight within a range of 1,000–10,000.

8. A clear paint composition according to claim 1, in which said acrylic resin (d) is obtained by copolymerizing 5–80% of alkoxysilyl-containing polymerizable monomer, 0.1–20% of dimethylpolysiloxane chain-containing polymerizable monomer, 10–95% of acrylic polymerizable monomer, not more than 50% of hydroxyl-containing polymerizable monomer and not more than 85% of other polymerizable monomer, based on the combined weight of all the monomers used.

9. A clear paint composition according to claim 1, in which said acrylic resin (d) has a number-average molecular weight within a range of 1,000–10,000.

10. A clear paint composition according to claim 1, which contains, based on the combined weight of solid contents of said components (a), (b) and (c), 35–49% by weight of component (a), 35–49% by weight of component (b) and 2–30% by weight of component (c); and which further contains, per 100 parts by weight of combined solid contents of said components (a), (b) and (c), 0.5–20 parts by weight of said component (d).

11. A clear paint composition according to claim 1, which contains, based on the combined weight of solid contents of said components (a), (b) and (c), 40–48% by weight of component (a), 40–48% by weight of component (b) and 4–20% by weight of component (c); and which further contains, per 100 parts by weight of combined solid contents of said components (a), (b) and (c), 1–5 parts by weight of said component (d).

12. Multi-layered coating formed by applying a clear paint composition as defined by claim 1 onto a surface of a base coating wherein said base coating is formed on a surface of an object.

13. Multi-layered coating according to claim 12, in which the base coating comprises metallic pigment and/or nacreous mica pigment.

14. Multi-layered coating according to claim 12, which is formed by applying a clear paint composition as defined in claim 1 onto a surface which is coated with said base coating but not yet cured, and heating the two layers at temperatures of 100–180° C. for 10–40 minutes to crosslink and cure them simultaneously.

15. Multi-layered coating according to claim 12, in which the coating thickness in terms of cured coating film of said clear paint composition is 10–60 μm.

16. Automotive bodies which are coated with a clear paint composition according to claim 1.

17. A method for coating a car body comprising: applying a base coating onto a car body to form a base-coated film; optionally curing the base-coated film; applying the clear paint composition according to claim 1 onto the optionally cured base-coated film to form a clear-coated film; and then heating the clear-coated film to cure either the clear-coated film or both the clear-coated film and the optionally cured base-coated film.

* * * * *